United States Patent Office 2,967,776
Patented Jan. 10, 1961

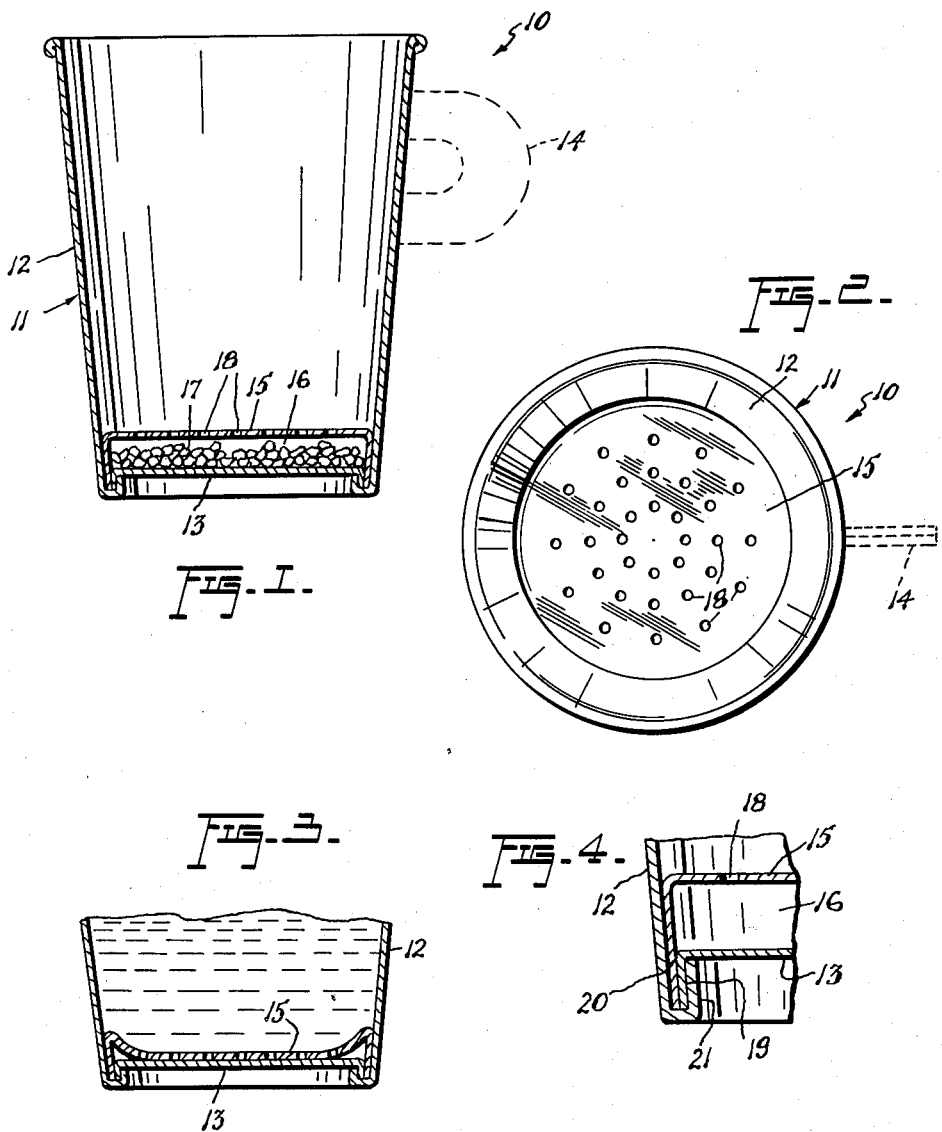

2,967,776
BEVERAGE CONTAINERS
Murlon T. Utley, Box 2, Steele, Mo.
Filed Dec. 18, 1957, Ser. No. 703,595
1 Claim. (Cl. 99—171)

This invention relates to new and useful improvements in beverage containers and in particular concerns itself with a container embodying a soluble beverage ingredient which is adapted to infuse into a liquid ingredient when the latter is placed in the container.

As such, the principal object of the invention is to provide a container with a supply of a soluble beverage ingredient, which may be quickly and easily prepared for consumption by mixing a liquid ingredient therewith, the invention being particularly well adapted for use in the form of a disposable paper cup at lunch counters, canteens, automatic beverage dispensing machines, and the like.

An important feature of the invention resides in providing the container with a foraminous partition which defines a chamber in the bottom portion of the container, and also providing a soluble beverage ingredient, such as for example, "instant" coffee, in the chamber, for infusion through the foraminous partition into a liquid ingredient, such as hot water, for example, when the latter is poured into the container. It is to be understood, of course, that the invention is by no means limited for use with coffee as the beverage, but may be used for soup, flavored drinks, tea, dehydrated milk, or any other kind of beverage which is made by the mixing or infusion of a soluble ingredient with a liquid.

Another important feature of the invention resides in forming the foraminous partition so that it sags to the bottom of the container when the liquid ingredient is poured in and the soluble ingredient is infused, whereby the aforementioned chamber which initially existed in the bottom portion of the container is substantally eliminated and cannot act as a sediment trap, thus assuring complete infusion of the soluble ingredient and homogenous consistency of the beverage.

Some of the advantages of the invention reside in its simplicity of construction, in its convenient and readily available operation, and in its adaptability to economical manufacture, particularly in terms of one-use disposable type containers such as paper cups.

With the foregoing more important objects and features in view and such other objects and features as may become apparent as this specification proceeds, the invention will be understood from the following description taken in conjunction with the accompanying drawing, wherein like characters of reference are used to designate like parts, and wherein:

Figure 1 is a vertical sectional view of a beverage container embodying the invention;

Figure 2 is a top plan view thereof;

Figure 3 is a fragmentary vertical sectional view showing the bottom portion of the container after placing of the liquid ingredient therein; and Figure 4 is a fragmentary sectional detail on an enlarged scale, showing the construction of the seam at the bottom of the container.

Referring now to the accompanying drawing in detail, the beverage container in accordance with the invention is designated generally by the reference numeral 10 and, in the instance illustrated, is in the form of a paper cup 11, including the usual side wall 12 and a bottom 13. If desired, the side wall 12 of the cup may be provided with the usual handles 14 which are folded against the side wall prior to use but may be extended radially outwardly as shown to facilitate holding of the cup, especially when filled with hot beverages.

A foraminous partition 15 is provided in the container in a plane spaced above the bottom 13, whereby to form a chamber 16 in the bottom portion of the container, as shown in Figures 1 and 4.

The chamber 16 accommodates a supply of a suitable, soluble beverage ingredient, such as "instant" coffee, for example, as indicated at 17, it being understood, of course, that any other ingredient in solid, granulated, tablet, powder or paste form may be used, depending upon the nature of the beverage which is to be served. The partition 15 is provided with a plurality of openings or apertures 18, through which the ingredient 17 may infuse into the main body portion of the container, as will be further explained.

The bottom 13 is provided with a downturned marginal flange 19 and the partition 15 is also provided with a similar flange 20, the flange 19 and the lower edge portion of the flange 20 being crimped in an inturned portion 21 at the bottom of the side wall 12, whereby to form a seam for securing both the bottom 13 and the partition 15 to the side wall, as is best shown in Figure 4. When the invention is placed in use, such as for example, at a lunch counter, a canteen, an automatic beverage dispensing machine, or the like, it is only necessary to add a suitable liquid ingredient to the container, such as water, for example, so that the soluble ingredient 17 will infuse through the openings 18 in the partition 15 into the liquid and thereby instantly render the beverage suitable for consumption.

The partition 15 is formed from a suitable liquid permeable material such as paperboard, nylon or cotton fabric, or the like, which is suitably treated in any conventional manner so as to be relatively stiff and rigid when dry, but relatively soft and flexible when wet. As such, the partition will effectively retain its initial form to provide the chamber 16 before the cup is used, but when the liquid ingredient is poured into the cup and the soluble ingredient 17 is infused, the partition will sag to the bottom 13 as shown in Figure 3, so that the chamber 16 is virtually non-existent. Thus, the chamber will not materially exist to act as a sediment trap, infusion of the soluble ingredient will be more complete, and a homogenous consistency of the beverage will result.

It may be noted that while the invention is primarily intended for embodiment in disposable paper cups, it is of course applicable for use in containers in general.

While in the foregoing there has been shown and described the preferred embodiment of the invention, various modifications may become apparent to those skilled in the art to which the invention relates. Accordingly, it is not desired to limit the invention to this disclosure and various modifications may be resorted to such as may lie within the spirit and scope of the appended claim.

What is claimed as new is:

A vessel for preparing and drinking instantly prepared beverages, comprising a disposable paper cup having a side wall, an imperforate bottom, and a foraminous partition spaced above said bottom and defining a chamber in the bottom portion of said cup, and a soluble beverage ingredient in dry form provided in said chamber, said soluble ingredient being adapted to infuse through said foraminous partition into a liquid beverage ingredient when the latter is poured into the cup, said partition being formed from liquid permeable material treated to be relatively rigid when dry but relatively soft when wet, whereby the partition will sag to the bottom of the cup upon infusion of the soluble ingredient into the liquid ingredient to assure homogenous consistency of the prepared beverage by preventing trapping of undissolved particles of the soluble ingredient in said chamber.

References Cited in the file of this patent

UNITED STATES PATENTS

| | | |
|---|---|---|
| 1,592,395 | Sulzberger | July 13, 1926 |
| 1,889,111 | Serr | Nov. 29, 1932 |
| 2,743,664 | Dale | May 1, 1956 |